United States Patent
Strobl et al.

(10) Patent No.: US 10,239,620 B2
(45) Date of Patent: Mar. 26, 2019

(54) AIRCRAFT SEAT DEVICE HAVING AN AIR BAG ELEMENT

(71) Applicant: RECARO Aircraft Seating GmbH & Co. KG, Schwaebisch Hall (DE)

(72) Inventors: Florian Strobl, Mainhardt (DE); Simon Weisenberger, Leutershausen (DE); Mohammed Daher, Waiblingen (DE); Juergen Kammerer, Vellberg (DE)

(73) Assignee: RECARO Aircraft Seating GmbH & Co. KG, Schwaebisch Hall (DE)

( * ) Notice: Subject to any disclaimer, the term of this patent is extended or adjusted under 35 U.S.C. 154(b) by 0 days.

(21) Appl. No.: 15/510,847

(22) PCT Filed: Sep. 3, 2015

(86) PCT No.: PCT/EP2015/070176
§ 371 (c)(1),
(2) Date: Mar. 13, 2017

(87) PCT Pub. No.: WO2016/041783
PCT Pub. Date: Mar. 24, 2016

(65) Prior Publication Data
US 2017/0240285 A1    Aug. 24, 2017

(30) Foreign Application Priority Data
Sep. 15, 2014   (DE) .................. 10 2014 113 277

(51) Int. Cl.
*B64D 11/06*   (2006.01)
*B60R 21/20*   (2011.01)
(Continued)

(52) U.S. Cl.
CPC ........ *B64D 11/06205* (2014.12); *B60R 21/20* (2013.01); *B60R 21/231* (2013.01);
(Continued)

(58) Field of Classification Search
CPC ............ B64D 11/06205; B60R 21/237; B60R 21/233; B60R 21/231; B60R 21/2338;
(Continued)

(56) References Cited

U.S. PATENT DOCUMENTS 6,361,072 B1 *  3/2002  Barnes ................. B60R 21/233
                                                          280/728.1
9,821,913 B1 *  11/2017  Deevey ............ B64D 11/06205
(Continued)

FOREIGN PATENT DOCUMENTS

DE       4008243 A1    9/1991
DE      19834061 A1    2/2000
(Continued)

OTHER PUBLICATIONS

Website: www.seatguru.com.*
(Continued)

*Primary Examiner* — Darlene P Condra
(74) *Attorney, Agent, or Firm* — Posz Law Group, PLC

(57) ABSTRACT

An airplane seat device includes at least one airplane seat, and at least one console arranged, viewed in a flight direction, in front of the airplane seat, and at least one airbag element which is configured to protect in a crash event a passenger sitting in the airplane seat from crashing onto the console. At least one airbag element features, in a fully deployed state, at least in a head-impact zone, a thickness which is smaller than a thickness in at least one shoulder-impact zone.

14 Claims, 5 Drawing Sheets

Figure 1:
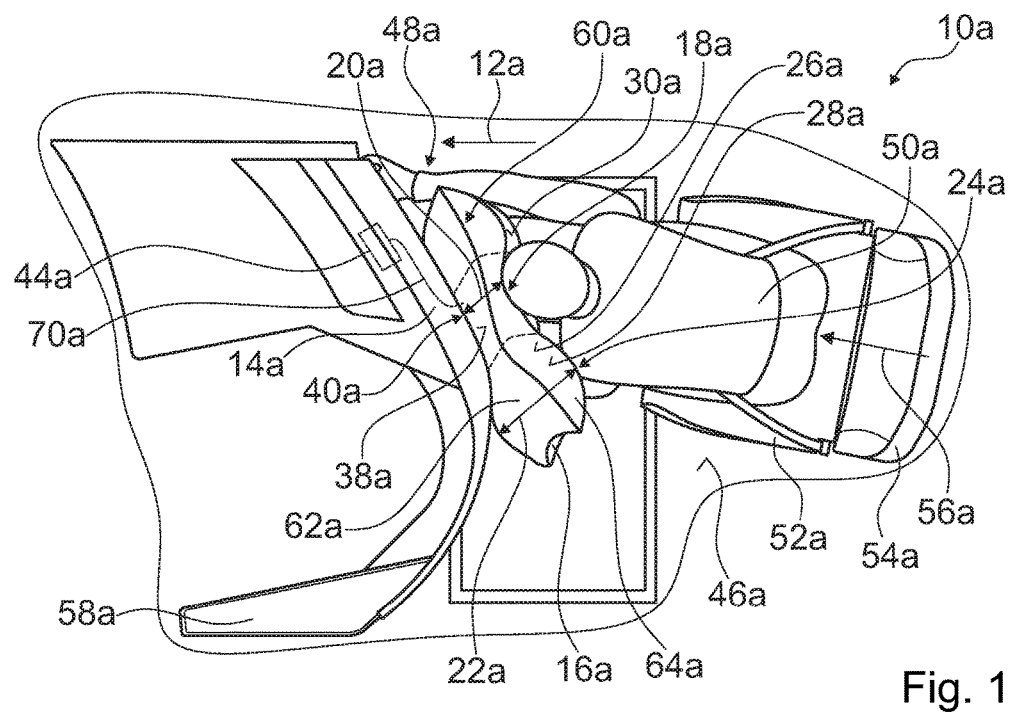

(51) Int. Cl.
  *B60R 21/231* (2011.01)
  *B60R 21/233* (2006.01)
  *B60R 21/2338* (2011.01)
  *B60R 21/237* (2006.01)
  *B60R 21/00* (2006.01)

(52) U.S. Cl.
  CPC .......... *B60R 21/233* (2013.01); *B60R 21/237* (2013.01); *B60R 21/2338* (2013.01); *B60R 2021/0048* (2013.01); *B60R 2021/0058* (2013.01); *B60R 2021/0093* (2013.01)

(58) Field of Classification Search
  CPC .... B60R 2021/0058; B60R 2021/0048; B60R 2021/0093; B60R 21/20
  See application file for complete search history.

(56) References Cited

U.S. PATENT DOCUMENTS

| | | | |
|---|---|---|---|
| 2007/0205590 A1* | 9/2007 | Klinkenberger | B60R 21/233 280/743.2 |
| 2012/0038134 A1 | 2/2012 | Rick | |
| 2013/0087995 A1 | 4/2013 | Lee et al. | |
| 2013/0088056 A1* | 4/2013 | Quatanens | B60R 21/233 297/216.13 |
| 2013/0106079 A1 | 5/2013 | Jarboe et al. | |
| 2013/0106080 A1* | 5/2013 | Jarboe | B64D 11/06 280/730.2 |
| 2013/0341975 A1 | 12/2013 | Schneider et al. | |
| 2014/0097661 A1 | 4/2014 | Loher | |
| 2014/0210193 A1 | 7/2014 | Co et al. | |
| 2015/0232184 A1* | 8/2015 | Gehret | B64D 11/0621 244/121 |
| 2016/0096627 A1* | 4/2016 | Gehret | B60R 21/207 244/121 |
| 2017/0008632 A1* | 1/2017 | Eberle | B64D 11/0619 |
| 2017/0203847 A1* | 7/2017 | Browning | B64D 25/02 |
| 2017/0225788 A1* | 8/2017 | Humbert | B64D 11/0621 |

FOREIGN PATENT DOCUMENTS

| | | |
|---|---|---|
| DE | 102004024548 A1 | 12/2005 |
| DE | 102010034113 A1 | 2/2012 |
| DE | 102011056992 A1 | 4/2013 |
| DE | 102012109597 A1 | 4/2014 |
| DE | 102014201665 A1 | 7/2014 |

OTHER PUBLICATIONS

Search Report dated Feb. 23, 2015 issued in corresponding DE patent application No. 10 2014 113 277.7 (and partial English translation).

International Search Report of the International Searching Authority dated Nov. 12, 2015 issued in corresponding International Application No. PCT/EP2015/070176.

International Preliminary Report on Patentability dated Mar. 30, 2017 issued in corresponding International Application No. PCT/EP2015/070176.

* cited by examiner

AIRCRAFT SEAT DEVICE HAVING AN AIR BAG ELEMENT

CROSS REFERENCE TO RELATED APPLICATIONS

This application is a U.S. national stage application of PCT/EP2015/070176 filed on Sep. 3, 2015, which is based on German Patent Application No. 10 2014 113 277.7 filed on Sep. 15, 2014, the contents of which are incorporated herein by reference.

STATE OF THE ART

The invention relates to an airplane seat device according to the preamble of patent claim 1.

An airplane seat device with at least one airplane seat and with at least one console which is arranged, viewed in a flight direction, in front of the airplane seat, and with at least one airbag element which is configured to protect in a crash event a passenger sitting in the airplane seat from crashing onto the console, has already been proposed.

The objective of the invention is in particular to provide a generic device with improved characteristics regarding safety for a passenger. The objective is achieved, according to the invention, by the features of patent claim 1, while advantageous implementations and further developments of the invention will become apparent from the subclaims.

Advantages of the Invention

The invention is based on an airplane seat device with at least one airplane seat, and with at least one console arranged, viewed in a flight direction, in front of the airplane seat, and with at least one airbag element which is configured to protect in a crash event a passenger sitting in the airplane seat from crashing onto the console.

It is proposed that the at least one airbag element features, in a fully deployed state, at least in a head-impact zone, in a fully deployed state, a thickness which is smaller than a thickness in at least one shoulder-impact zone. By an "airplane seat" is herein in particular a seat to be understood which is configured to be mounted in an airplane cabin of an airplane on a cabin floor and on which a passenger can sit on during a flight. Herein the airplane seat comprises a seat bottom and a backrest which is coupled with the seat bottom, wherein the backrest is preferably connected to the seat bottom pivotally, as a result of which the airplane seat is preferably movable into different functional positions. By a "flight direction" is herein in particular a main extension direction of the airplane to be understood, wherein the flight direction extends from a tail of the airplane to a bow of the airplane and preferentially extends coaxially to a middle axis of the airplane. By a "console" is herein in particular a region of the airplane seat device to be understood in which add-on elements and operating elements for a passenger are arranged in the airplane seat device, e.g. in particular a monitor screen, a table device or a storage device. By an "airbag element" is herein in particular an element to be understood which is implemented by at least one air cushion and is configured to be filled with a gas in a crash event, for the purpose of providing in a fully deployed state at least one impact zone for at least one body part of a passenger which the passenger can hit on and is decelerated by the gas leaving the air cushion, e.g. through valves or holes or through the material of the airbag element itself. It is herein conceivable that the airbag element is only implemented by an upper plate and a lower plate which are respectively sewed together on their sides. Principally it is also conceivable that the airbag element additionally features envelope elements, which are sewn together with the upper plate and the lower plate respectively, resulting in the upper plate and the lower plate being connected to each other not directly but via the envelope elements and the airbag element thus having, in the lateral regions as well, a thickness that is determined by the width of the respective envelope element. Herein the upper plate, the lower plate and the envelope elements are each embodied of a tear-proof fabric which is suitable for being used as an airbag element. A "crash event" is herein in particular to mean a mechanical-overload event, i.e. an operating state in which forces act onto the airplane seat device and/or onto the airplane seat which exceed the forces occurring due to normal load in normal flight operation. "Configured" is in particular to mean specifically designed and/or equipped. An object being configured for a certain function is in particular to mean that the object fulfills and/or implements said certain function in at least one application state and/or operating state. By a "fully deployed state of the airbag element" is herein in particular a state of the airbag element to be understood in which the airbag element is configured for a passenger crashing onto the airbag element, wherein the airbag element has a greatest possible protective effect. Herein the fully deployed state of the airbag element is preferably implemented as a state in which the airbag element is filled to maximum. By a "head-impact zone" is herein in particular a region of the airbag element to be understood which is configured for a passenger's head crashing on it, in a crash event, when the airbag element substantially reaches its fully deployed state. A "substantially fully deployed state of the airbag element" is herein in particular to mean a state of the airbag element in which the airbag element is deployed, i.e. filled, by at least 75%, preferably by 90%, and in an especially advantageous implementation by 100%. A "shoulder-impact zone" is herein in particular to mean a region of the airbag element which is configured for a passenger's shoulder crashing onto it when the airbag element reaches its fully deployed state. A "thickness of the head-impact zone" is herein in particular to mean a minimum distance between an upper plate and a lower plate of the airbag element in the head-impact zone. An implementation according to the invention advantageously allows preventing or at least reducing a turning of a passenger's head when hitting onto the airbag element in a crash event, as a result of which an airplane seat device may be rendered available which advantageously reduces an injury risk in a crash event. This advantageously allows increasing safety for a passenger.

It is further proposed that the airplane seat is oriented aslant with respect to the flight direction. "Obliquely with respect to the flight direction" is herein in particular to mean that a seat direction of a flight passenger area includes an angle with the flight direction which is between 1 degree and 90 degrees, preferably between 1 degree and 45 degrees and particularly preferably between 5 degrees and 20 degrees. Herein the angle the seat direction of the flight passenger seating area includes with the flight direction is in particular different from 90 degrees. This allows especially advantageous use of the airbag element.

Furthermore it is proposed that the at least one airbag element forms a concave impact side. By an "impact side" is herein in particular a side and/or region of the airbag element to be understood which, in a substantially fully deployed state of the airbag element, faces towards the passenger and is configured for the passenger crashing on it during a crash event. By the impact side being embodied "concave" is herein in particular to be understood that an inner region of the impact side is pulled further inwards than outer regions of the impact side, wherein two partial regions, which face towards each other, merge with each other in a transition region, wherein the two partial regions may meet each other directly to form thus a wedge-shaped impact side or to merge with each other in a transition region in a parabola-like shape. This allows advantageously implementing the airbag element for an impact of a passenger.

It is also proposed that the at least one airbag element forms an impact side featuring a wedge shape. This allows implementing the impact side in an especially advantageous manner for an impact of a passenger.

Moreover it is proposed that the impact side features an inwards-pointing wedge shape. "Inwards-pointing" is herein in particular to mean that two partial regions of the wedge shape face towards each other, wherein a normal standing orthogonally on one of the partial surfaces is oriented towards the other partial surface. This allows advantageously implementing of the wedge shape for the impact side.

It is further proposed that the impact side is embodied by at least two partial surfaces, the two partial surfaces including, in the fully deployed state of the airbag element, different angles with the airplane seat. By a "partial surface" is herein in particular a surface to be understood embodying at least a portion of the impact side while featuring at least one other orientation than a further partial surface. It is herein conceivable that the two partial surfaces meet directly, resulting in a concrete transition between the two partial surfaces, or that the two partial surfaces merge with each other in continuous transition, wherein the partial surfaces have, in a transition region, a parabola shape. The partial surfaces of the impact side are herein preferably embodied by overedging seams or catch straps. This allows advantageously embodying the impact side in such a way that in a crash event a passenger's shoulders advantageously crash onto the airbag element approximately simultaneously.

Furthermore it is proposed that a lower region of the airbag element is in a fully deployed state arranged closer to the passenger than an upper region of the airbag element. By a "lower region of the airbag element" is herein in particular a region of the airbag element to be understood which, in a substantially fully deployed state of the airbag element, faces a mounting plane which the airplane seat device is mounted on. By an "upper region of the airbag element" is herein in particular a region of the airbag element to be understood which, in a substantially fully deployed state of the airbag element, faces away from a mounting plane which the airplane seat device is mounted on. By a "mounting plane" is herein in particular a plane to be understood on which elements, e.g. in particular airplane seats, are mounted, wherein the mounting plane is herein in particular embodied by a cabin floor of an airplane cabin. In this way advantageously a shape of the airbag element is achievable which is in a lateral view triangle-like or trapezoid-like, as a result of which in particular a particularly advantageous impact of a passenger is achievable in a crash event.

It is moreover proposed that the airbag element is embodied by an air cushion in which at least one elastic catch strap is integrated, which is configured to implement a shape of the airbag element. By an "elastic catch strap" is herein in particular a strap to be understood which is made of an elastic material and which, in a state of being deflected out of a rest position, in particular in a stretched state, features a reset force towards the rest position and has a constant tendency to return into its rest position. "Integrated" is herein in particular to mean connected to the airbag element in an advantageous manner, the elastic catch strap herein being preferably sewed together with the air bag element. Principally it is also conceivable that the elastic catch strap is woven into the material of the airbag element or that the elastic catch strap is adhesively bonded with the airbag element or is fixedly connected to the airbag element in another way that is deemed expedient by someone skilled in the art. As a result, the airbag element can advantageously be given a required shaping.

It is also proposed that the at least one airbag element comprises at least two chambers implemented by overedging seams. By a "chamber" is herein in particular an inner region of the airbag element to be understood which is substantially separate from a further chamber and is filled with the gas for deploying the airbag element. Two neighboring chambers are herein separated from each other by overedging seams and are preferably at least partly coupled with each other via connecting channels which are implemented by interruptions of the overedging seams. Via the connecting channels left free, a gas can flow from one chamber into the other chamber on deployment. By means of design and placing of the connecting channels, herein a deployment behavior of the airbag element is adjustable. An "overedging seam" is herein in particular to mean a seam directly connecting a front side, i.e. a lower plate, and a rear side, i.e. an upper plate, of the airbag to each other. In this way the airbag element can be advantageously segmented.

Furthermore it is proposed that the at least one airbag element comprises at least one asymmetrical abutment surface which is configured for abutting on an airplane seat component. By an "abutment surface" is herein in particular a surface to be understood with which in a fully deployed state the airbag element faces the airplane seat component, to which it is preferably fixated as well and on which it is supported, in particular if a passenger crashes onto the airbag element on the impact side. By an "aircraft seat component" is herein, in this context, in particular a structural component of an airplane seat or of an airplane seat region to be understood, e.g. a console or a backrest. As a result of this, the airbag element can especially advantageously be supported on the airplane seat.

It is further proposed that the at least one airbag element has a directed unfolding in a deployment event. A "directed unfolding" is herein in particular to mean an unfolding of the airbag element which extends in a defined, predetermined direction by way of a defined folding of the airbag element. This advantageously allows determining in advance in which way the airbag element unfolds as well as achieving a particularly great degree of protection for a passenger.

Beyond this, it is proposed that the at least one airbag element is configured to be vertically unrolled in a deployment event. A "deployment event" is herein in particular to mean an event in which the airbag element is deployed, i.e. filled with a gas. Herein the deployment event preferably occurs in a crash event. This allows bringing the airbag element into a fully deployed state in a simple manner.

It is moreover proposed that the at least one airbag element is configured to be unrolled from top to bottom. In this way the airbag element can be especially advantageously and easily unrolled into a fully deployed state, thus in particular advantageously achieving that the airbag element is not directed directly onto a passenger's head, the passenger's shoulders being caught first.

Further it is proposed that the at least one airbag element comprises at least one connection point, via which the airbag element is configured to be punctually connected to an airplane seat component. By a "connection point" is herein in particular a point to be understood via which the airbag element is punctually connected to the airplane seat component. Herein the airbag element is fixedly connected to the airplane seat component. This allows connecting the airbag element in a particularly simple fashion.

It is further proposed that the at least one airbag element comprises at least one connection surface, via which the airbag element is configured to be connected to an airplane seat component in surface-to-surface fashion. This allows connecting the air bag element in an especially advantageous fashion.

In addition, it is proposed that at least one generator for the at least one airbag element is configured to be connected to an airplane seat component in such a way that it is spatially separate from the airbag element. By a "generator" is herein in particular a device to be understood which is able to supply in a very short time a great volume of a gas for filling the airbag element. The generator herein preferably comprises a chemical propellant charge supplying, via a chemical reaction in a short time, a gas which is fed into the airbag element for filling the airbag element. "Spatially separate" is herein in particular to mean that the generator is mounted to an airplane seat component separate from and spaced apart from the airbag element. Herein the generator and the airbag element are coupled with each other via a hose, allowing a gas to flow into the airbag element from the generator through the hose for the purpose of unfolding the airbag element. In this way the airbag element may be implemented advantageously small and compact, as the generator is arrangeable in an advantageous place.

The airplane seat device according to the invention is herein not to be restricted to the application and implementation form described above. In particular, the airplane seat device according to the invention may, for fulfilling a functionality herein described, comprise a number of respective elements, structural components and units that differs from the number mentioned herein.

DRAWINGS

Further advantages may be gathered from the following description of the drawings. In the drawings three exemplary embodiments of the invention are shown. The drawings, the description and the claims contain a plurality of features in combination. Someone having ordinary skill in the art will purposefully consider the features separately and will find further expedient combinations.

Figure 2:
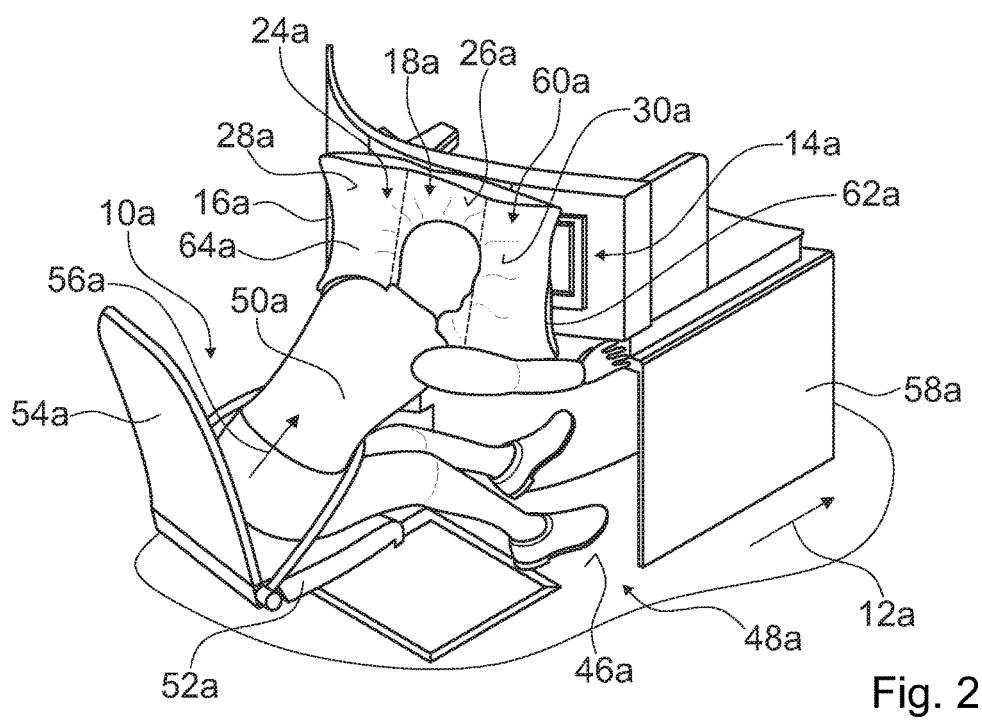
Figure 3:
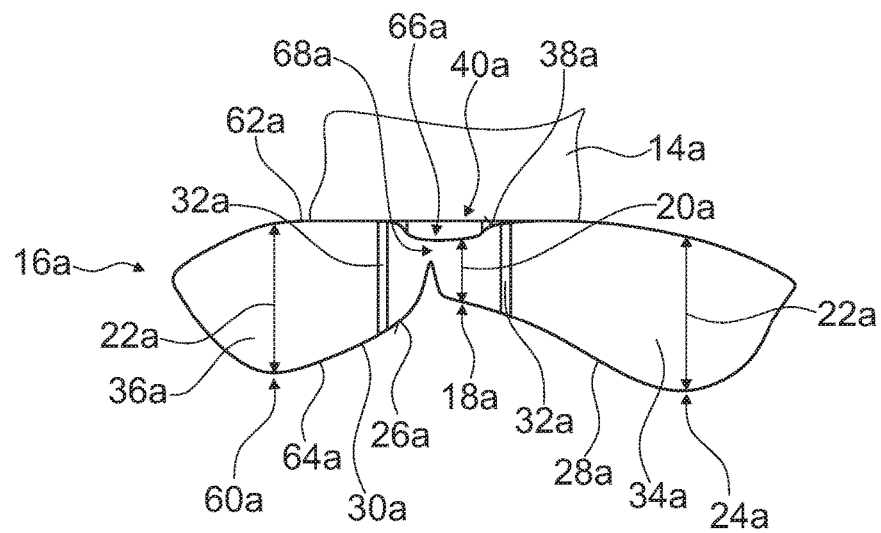
Figure 4:
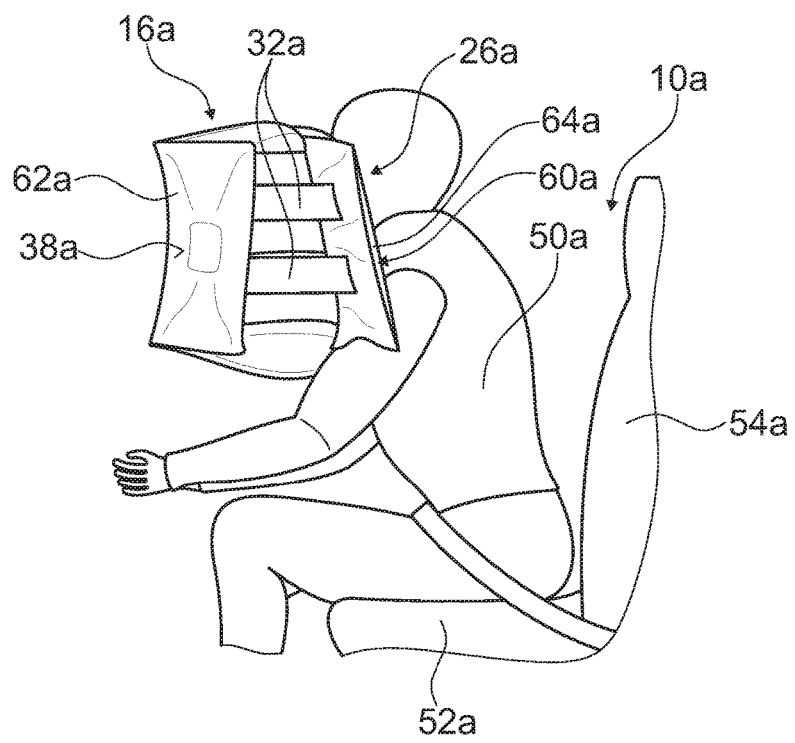
Figure 5:
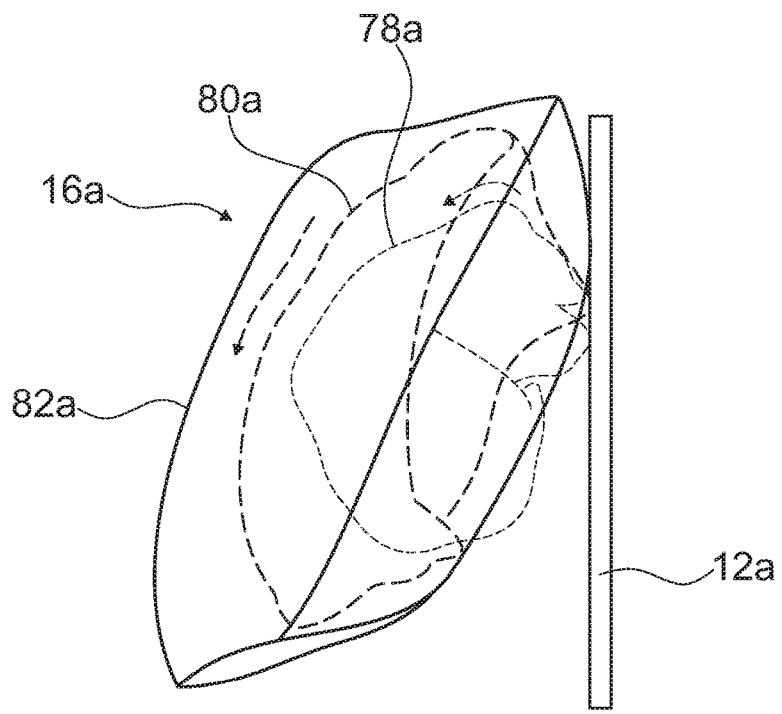
Figure 6:
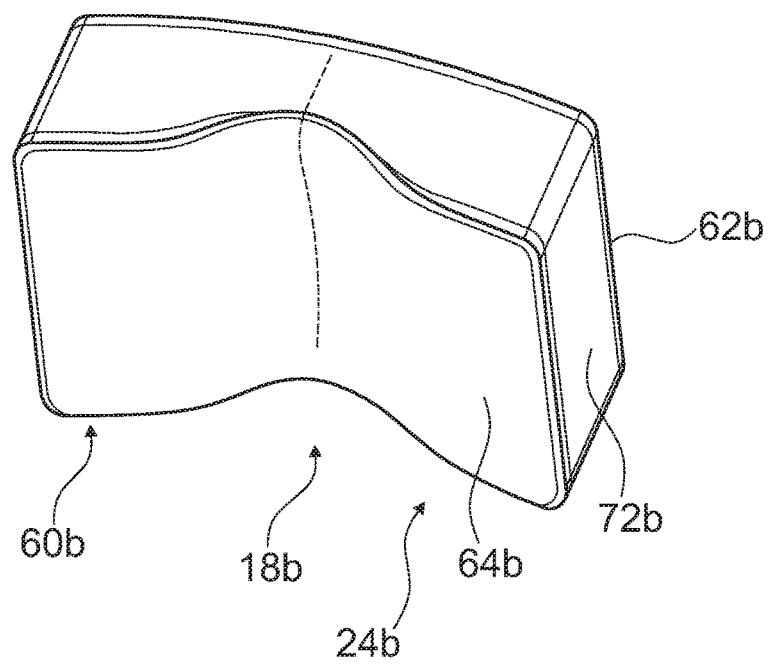
Figure 7:
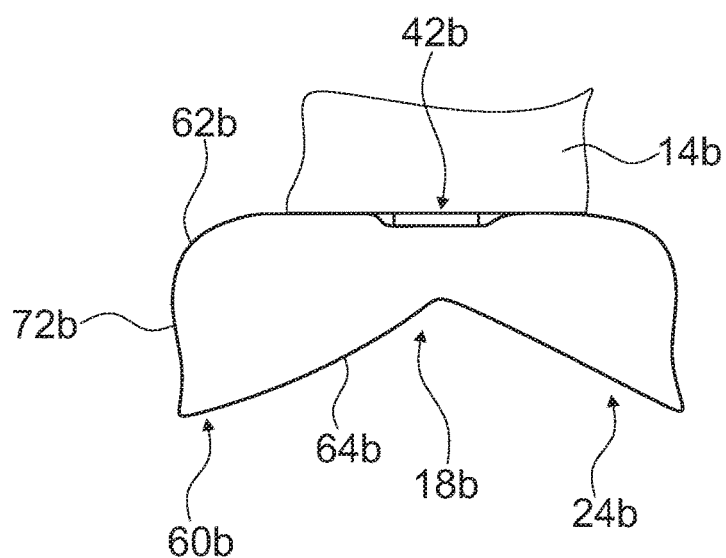
Figure 8:
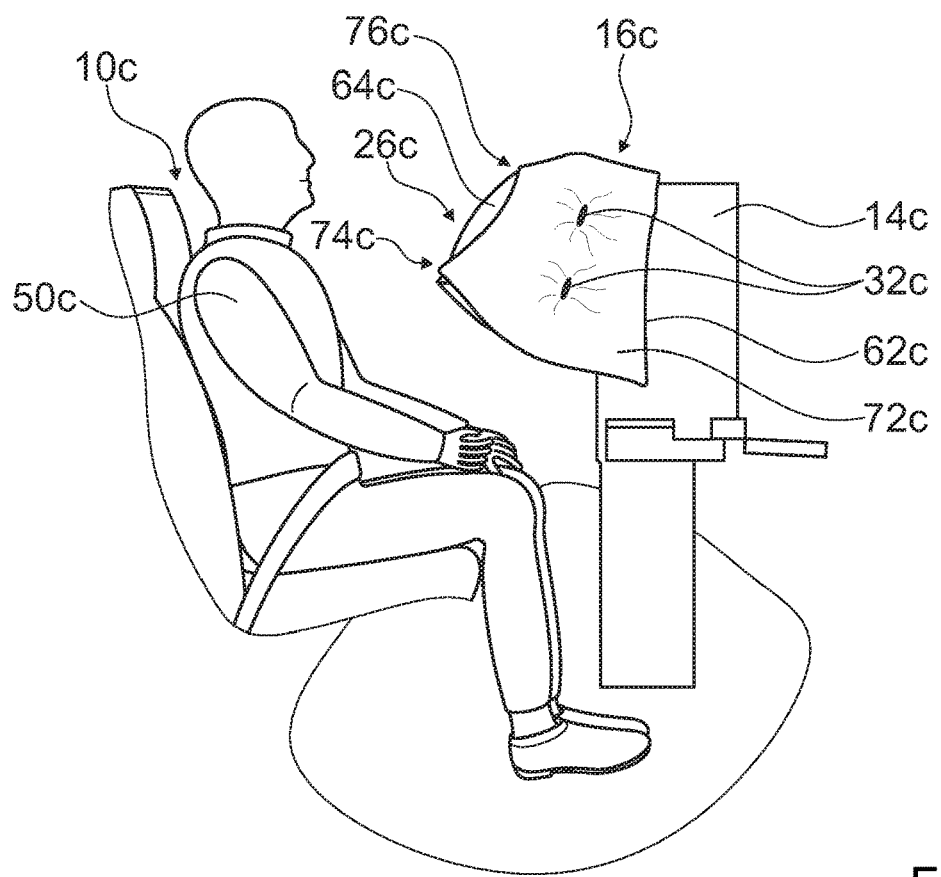
Figure 9:
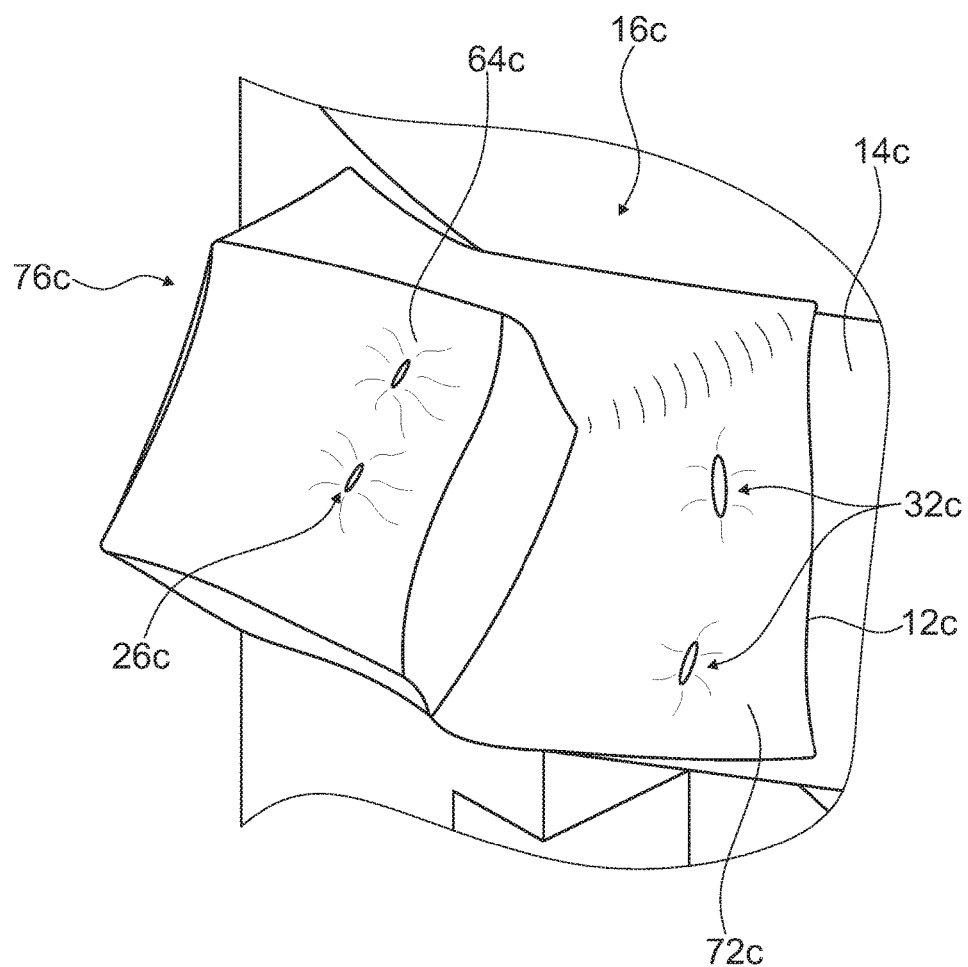

It is shown in:

FIG. 1 a schematic view from the top onto an airplane seat device according to the invention, with an airbag element in a fully deployed state and a passenger hitting onto the airbag element, FIG. 2 a schematic view of FIG. 1 from another perspective, FIG. 3 a schematic view of the airbag element of the airplane seat device according to the invention, in the first exemplary embodiment, FIG. 4 a schematic sectional view of the airbag element, in a lateral view, FIG. 5 a schematic view of the airbag element in different stages of deployment, FIG. 6 a schematic view of an airbag element of an airplane seat device according to the invention, in a second exemplary embodiment, FIG. 7 another view of the airbag element of the airplane seat device according to the invention in the second exemplary embodiment, FIG. 8 a schematic view of an airbag element of an airplane seat device according to the invention, in a third exemplary embodiment, and FIG. 9 a schematic isometric view of the airbag element in the third exemplary embodiment.

DESCRIPTION OF THE EXEMPLARY EMBODIMENTS

FIGS. 1 to 5 show an airplane seat device according to the invention in a first exemplary embodiment. The airplane seat device is in a mounted state arranged in an airplane cabin of an airplane. The airplane herein implements a flight direction 12a. The flight direction 12a is implemented as a direction extending from a tail of the airplane to a bow of the airplane. Herein the flight direction 12a extends coaxially to a middle axis of the airplane cabin. The airplane seat device comprises an airplane seat 10a. The airplane seat 10a is mounted on a cabin floor 46a of the airplane cabin. The airplane seat 10a comprises a seat bottom 52a and a backrest 54a, which are preferably connected to each other in a pivotable fashion. The airplane seat 10a is herein oriented aslant to the flight direction 12a. The airplane seat 10a implements a seat direction 56a constituting a direction in which a passenger 50a is sitting straight on the airplane seat 10a. The seat direction 56a is herein oriented orthogonally to a backrest surface embodied by the backrest 54a, in parallel to the cabin floor 46a. The seat direction 56a of the airplane seat 10a features, in a mounted state of the airplane seat 10a, an angle with respect to the flight direction 12a. The angle included by the seat direction 56a of the airplane seat 10a with the flight direction 12a is herein 15 degrees. Principally it is also conceivable that the seat direction of the airplane seat 10a includes an angle with the flight direction 12a which is in a range from 5 degrees to 20 degrees. The airplane seat device implements a flight passenger seating area 48a. The flight passenger seating area 48a is embodied as the region in the airplane cabin which is available to a passenger 50a during a flight. The airplane seat 10a is arranged in the flight passenger seating area 48a. The airplane seat device further comprises a console 14a. The console 14a is part of the airplane seat region 48a. Herein the console 14a is arranged, viewed in the flight direction 12a, in front of the airplane seat 10a. The airplane seat 10a faces towards the console 14a with its seat bottom 52a and its backrest 54a, i.e. with the seat direction 56a. The airplane seat device comprises a shell element 58a, which separates the flight passenger seating area 48a with the airplane seat 10a from a flight passenger seating area that is arranged, in flight direction 12a, to the front of it. The shell element 58a is arranged in flight direction 12a in front of the airplane seat 10a and implements the console 14a. Further elements are connected to the shell element 58a, e.g. a monitor screen, a table or other functional elements for the flight passenger seating area 48a.

The airplane seat device comprises an airbag element 16a. The airbag element 16a is configured to protect, in a crash event, a passenger 50a sitting in the airplane seat 10a from crashing onto the console 14a. The airbag element 16a is herein mounted to an airplane seat element, in particular to the console 14a. Principally it would also be conceivable that the airbag element 16a is mounted to a cabin ceiling. The airbag element 16a is herein connected to the shell element 58a. The airbag element 16a features a non-deployed state. In the non-deployed state the airbag element 16a is arranged within the shell element 58a. In the non-deployed state the airbag element 16a is not filled with a gas. Herein the airbag element 16a is in the non-deployed state arranged behind a screen (not shown in detail), which screens the airbag element 16a from an outside in the non-deployed state.

In a fully deployed state the airbag element 16a covers the console 14a, thus protecting the passenger 50a from crashing onto the console 14a in a crash event. The airbag element 16a comprises different partial regions. The airbag element 16a herein features a head-impact zone 18a. The head-impact zone 18a is herein configured for a head of the passenger 50a hitting onto the airbag element 16a in this zone in a crash event. The head-impact zone 18a is herein arranged approximately centrally on the airbag element 16a in a transverse direction. Viewed in the transverse direction, respectively one shoulder-impact zone 24a, 60a is arranged laterally next to the head-impact zone 18a. The shoulder-impact zones 24a, 60a are respectively arranged beside the head-impact zone 18a and are configured for the passenger 50a sitting on the airplane seat 10a to hit, in a crash event, onto the corresponding shoulder-impact zone 24a, 60a with his respective shoulder. Herein a thickness 20a of the airbag element 16a is in the head-impact zone 18a smaller than a thickness 22a of the airbag element 16a in the shoulder-impact zones 24a, 60a. In the shoulder-impact zones 24a, 60a the airbag element 16a is embodied thicker than in the head-impact zone 18a. The airbag element 16a is herein implemented by an upper plate 62a and a lower plate 64a. The upper plate 62a and the lower plate 64a are embodied of a textured material. The upper plate 62a and the lower plate 64a are respectively connected to each other in their edge regions. Herein the upper plate 62a and the lower plate 64a are sewn together with each other. Principally it is also conceivable that the upper plate 62a and the lower plate 64a are implemented of one integrally woven element. Principally it is also conceivable that the upper plate 62a and the lower plate 64a are, in their edge regions, glued together or connected to each other in another fashion that is deemed expedient by someone skilled in the art. In a region within connecting seams by which the upper plate 6a and the lower plate 64a are connected to each other in their edge regions, the upper plate 62a and the lower plate 64a are separate from each other. The airbag element 16a is embodied by an air cushion. The upper plate 62a and the lower plate 64a implement the air cushion in the region within the connecting seams. In the region between the upper plate 62a and the lower plate 64a, the airbag element 16a can be filled with a gas and thus blown up. In case of a passenger 50a hitting onto the airbag element 16a, the gas escapes from the airbag element 16a and an impact of the passenger 50a is decelerated. In a fully deployed state, the upper plate 62a and the lower plate 64a have a greater distance from each other in a shoulder-impact zone 24a, 60a than in the head-impact zone 18a. In an outermost region, in which the upper plate 62a and the lower plate 64a are also connected to each other, a distance between the upper plate 62a and the lower plate 64a decreases once again until they merge into each other by a seam.

The airbag element 16a features an impact side 26a. The impact side 26a faces away from the console 14a and faces toward the airplane seat 10a. The impact side 26a implements the side of the airbag element 16a which, in a substantially fully deployed state, faces towards the passenger 50a, who is to be protected, and onto which the passenger 50a hits in a crash event. The impact side 26a is herein embodied by an outer side of the lower plate 64a of the airbag element 16a. Herein the impact side 26a is embodied concave. The concave impact side 26a herein implements the head-impact zone 18a and the shoulder-impact zones 24a, 60a. The impact side 26a herein forms a wedge shape. In particular, the impact side 26a forms a wedge-shape pointing inwards. Herein the peripheral regions, which in particular implement the shoulder-impact zones 24a, 60a, feature, in a fully deployed state of the airbag element 16a, an increasing distance from the upper plate 62a. The impact side 26a herein implements two partial surfaces 28a, 30a. Herein a peripheral portion of the partial surface 28a embodies the one shoulder-impact zone 24a and the peripheral portion of the partial surface 30a embodies the other shoulder-impact zone 60a. Inner regions of the partial surfaces 28a, 30a, which face toward each other, together implement the head-impact zone 18a. Herein the two partial surfaces 28a, 30a respectively merge with each other in the head-impact zone 18a. The partial surfaces 28a, 30a herein include, in a fully deployed state, different angles with the airplane seat 10a, in particular with the seat direction 56a of the airplane seat 10a. Due to the different angles included by the partial surfaces 28a, 30a with the airplane seat 10a, the shoulder-impact zone 24a, which faces toward the console 14a, and the shoulder-impact zone 60a, which faces away from the console 14a, can be staved off substantially simultaneously in a crash event, as a result of which a torsion of the body of the passenger 50a is advantageously preventable.

The airbag element 16a comprises elastic catch straps 32a. The elastic catch straps 32a are integrated in the airbag element 16a, which is embodied as an air cushion. The catch straps 32a are configured to implement the shape of the airbag element 16a. The catch straps 32a are embodied of an elastic material. Herein the catch straps 32a are preferably embodied of a same material as the airbag element 16a. The catch straps 32a are herein connected to the airbag element 16a. Herein the catch straps 32a are sewn together with the lower plate 64a and the upper plate 62a of the airbag element 16a. Principally it is also conceivable that the catch straps 32a are connected to the airbag element 16a in another fashion. Herein the catch straps 32a are arranged in an interior of the airbag element 16a. Herein the catch straps 32a are each connected to an inner side of the lower plate 64a and of the upper plate 62a. In a fully deployed state of the airbag element 16a, the catch straps 32a are under tension, thus limiting a distance between the lower plate 64a and the upper plate 62a of the airbag element 16a in a respective region of the respective catch strap 32a. In a non-deployed state the catch straps 32a are loosely arranged in the interior of the airbag element 16a. The catch straps 32a are configured to reduce a volume and/or a shaping of the airbag element 16a point-wise.

The airbag element 16a comprises two chambers 34a, 36a. The chambers 34a, 36a are separated from each other by an overedging seam 66a. The chambers 34a, 36a are configured for a directed unfolding of the airbag element 16a. The chambers 34a, 36a are herein coupled with each other via connecting channels 68a. This allows a gas flowing in the airbag element 16a during a deployment to flow between the chambers 34a, 36a. Principally it is also conceivable that the chambers 34a, 36a are embodied inside the airbag element 16a by way of separating walls sewn in between the lower plate 64a and the upper plate 62a. It is herein conceivable that the chambers 34a, 36a are coupled with each other, with respect to fluid dynamics, via simple connecting channels embodied by holes in the separating walls or by valves worked into the separating walls.

The airbag element 16a comprises an abutment surface 38a. In a fully deployed state, the abutment surface 38a faces towards the console 14a. In a fully deployed state, the airbag element 16a is braced on the console 14a with its abutment surface 38a. Herein the abutment surface 38a is embodied in an asymmetrical fashion. The asymmetrically embodied abutment surface 38a is adapted to the console 14a, which the airbag element 16a covers in a crash event, and is implemented correspondingly to the console 14a. In this way it is achievable that the airbag element 16a can advantageously be supported on the console 14a in a crash event, when the passenger 50a hits onto the airbag element 16a.

In a crash event the airbag element 16a is deployed via an electronics component (not shown in detail). Principally a mechanical deployment of the airbag element 16a is also conceivable. The airbag element 16a is herein in a crash event configured to be unrolled vertically. Herein the airbag element 16a features a directed unfolding. The airbag element 16a is herein unrolled from top to bottom. Herein the airbag element 16a unrolls in case of deployment from an upper edge of the console 14a towards the cabin floor 46a, which the airplane seat 10a is mounted on. It would herein principally also conceivable that at least a portion of the airbag element 16a is also unrolled upwards, away from the cabin floor 46a, or sideways. In FIG. 5 the airbag element 16a is shown schematically in different states of deployment. Herein the different deployment stages form implementations of the airbag element 16a at different points in time directly following deployment in a crash event. In the first deployment stage 78a directly following deployment, the airbag element 16a first of all unfolds away from the console 14a towards the passenger 50a. From the first deployment stage 78a to the second deployment stage 8a, the airbag element 16a unfolds substantially downwards, towards the mounting plane. Herein the airbag element 16a blows up further between the first deployment stage 78a and the second deployment stage 80a and therefore also extends farther towards the passenger 50a. This movement towards the passenger 50a due to further blowing up between the first deployment stage 78a and the second deployment stage 80a is, however, smaller than the movement downwards towards the mounting plane. In the third deployment stage 82a the airbag element 16a is fully deployed. Between the second deployment stage 80a and the third deployment stage 82a the airbag element 16a has extended farther downwards and has also blown up further.

The airbag element 16a comprises a connection point 40a. The airbag element 16a is connected to an airplane seat element via the connection point 40a. Herein the airbag element 16a is connected to the console 14a, in particular the shell element 58a, via the connection point 40a. Herein the airbag element 16a is connected to the shell element 58a punctually via the connection point 40a.

The airplane seat device comprises a generator 44a. The generator 44a is configured for the filling of the airbag element 16a. The generator 44a is herein embodied as a chemical generator 44a producing a great gas volume via a chemical reaction in short time. The generator 44a is connected spatially separate from the airbag element 16a. Herein the generator 44a is connected within the shell element 58a. The airplane seat device herein comprises a hose element 70a, which connects the generator 44a to the airbag element 16a. In case of deployment, a gas produced in the generator 44a flows through the hose element 70a into the airbag element 16a, filling the chambers 34a, 36a with the gas. Principally it is also conceivable that the airplane seat device comprises a plurality of hose elements 70a coupling the generator 44a with the airbag element 16a.

In FIGS. 6 to 9 two further exemplary embodiments of the invention are shown. The following descriptions and the drawings are substantially limited to the differences between the exemplary embodiments, wherein regarding structural components carrying the same designations, in particular regarding structural components with the same reference numerals, principally the drawings and/or the description of the other exemplary embodiments, in particular of FIGS. 1 to 5, may be referred to. For distinguishing the exemplary embodiments, the letter a is added to the reference numerals of the exemplary embodiment of FIGS. 1 to 5. In the exemplary embodiments of FIGS. 6 to 9 the letter a has been substituted by the letters b and c.

FIGS. 6 and 7 show an airplane seat device according to the invention in a second exemplary embodiment. The airplane seat device comprises an airplane seat and a console 14b. The airplane seat device comprises an airbag element 16b. The airbag element 16b is configured to protect in a crash event a passenger 50b sitting in the airplane seat from crashing onto the console 14b. The airbag element 16b is herein mounted to an airplane seat element, in particular the console 14b. Basically the airbag element 16b is embodied identically to the airbag element of the first exemplary embodiment. The airbag element 16b is also embodied by an upper plate 62b and a lower plate 64b. In contrast to the first exemplary embodiment, the upper plate 62b and the lower plate 64b are not directly connected to each other in their lateral regions. The upper plate 62b and the lower plate 64b are connected to each other via an envelope 72b. The envelope 72b is embodied of a same material as the upper plate 62b and the lower plate 64b. The envelope 72b is sewn together with the upper plate 62b at outer edges of the upper plate 62b. The envelope 72b is sewn together with the lower plate 64b at outer edges of the lower plate 64b. As a result of this, the upper plate 62b and the lower plate 64b are spaced apart from each other also in a region of their outer edges.

The connection of the airbag element 16b to the console 14b also slightly differs from the one of the first exemplary embodiment. The airbag element 16b comprises a connection surface 42b, via which the airbag element 16b is connected to the console 14b in a surface-to-surface connection. Herein the connection surface 42b is implemented rectangular. Principally it is also conceivable that the connection surface 42b features a different shape.

FIGS. 8 and 9 show an airplane seat device according to the invention in a third exemplary embodiment. The airplane seat device comprises an airplane seat 10c and a console 14c. The airplane seat device comprises an airbag element 16c. The airbag element 16c is configured to protect in a crash event a passenger 50c sitting in the airplane seat 10c from crashing onto the console 14c. The airbag element 16c is herein mounted to an airplane seat element, in particular the console 14c. The airbag element 16c is embodied substantially identically to the airbag element of the second exemplary embodiment. The airbag element 16c is also implemented by an upper plate 62c and a lower plate 64c. Equivalently to the second exemplary embodiment, the upper plate 62c and the lower plate 64c are not directly connected to each other in their lateral regions. The upper plate 62c and the lower plate 64c are connected to each other via an envelope 72c. The envelope 72c is implemented of a same material as the upper plate 62c and the lower plate 64c. The envelope 72c is sewn together with the upper plate 62c at outer edges of the upper plate 62c. The envelope 72c is sewn together with the lower plate 64*c* at outer edges of the lower plate 64*c*. As a result of this, the upper plate 62*c* and the lower plate 64*c* are spaced apart from each other also in a region of their outer edges. Differently from the second exemplary embodiment, a lower region 74*c* of the airbag element 16*c* is in a fully deployed state arranged closer to the passenger 50*c* than an upper region 76*c* of the airbag element 16*c*. The upper region 76*c* is implemented by a region of an impact side 26*c* of the airbag element 16*c* which faces away from a mounting plane. The lower region 74*c* is embodied by a region of the impact side 26*c* of the airbag element 16*c* which faces towards the mounting plane. Due to the design of the airbag element 16*c*, the airbag element 16*c* extends in a crash event in the lower region 74*c* farther towards the passenger 50*c* than in the upper region 76*c*. As a result of this, in the fully deployed state the airbag element 16*c* is in the lower region 74*c* embodied thicker than in the upper region 76*c*. Due to this, in the lower region 74*c*, in which a passenger hits with his upper body in a crash event, the airbag element 16*c* is embodied advantageously thicker, resulting in an especially advantageous protective effect being achievable. In a lateral view the airbag element 16*c* features a triangle-like, respectively a trapezoid-like, shape. The envelope 72*c* connecting the upper plate 62*c* and the lower plate 64*c* to each other is embodied trapezoid-shaped in lateral regions, an upper side being embodied narrower than a lower side. The airbag element 16*c* also comprises, like the airbag elements of the preceding exemplary embodiments, elastic catch straps 32*c*. These are only slightly indicated in FIG. 8. Herein the catch straps 32*c* are connected to the envelope 72*c* with one end.

| Reference numerals | | |
|---|---|---|
| 10 | Flugzeugsitz | airplane seat |
| 12 | Flugrichtung | flight direction |
| 14 | Konsole | console |
| 16 | Airbagelement | airbag element |
| 18 | Kopfaufschlagsbereich | head-impact zone |
| 20 | Dicke | thickness |
| 22 | Dicke | thickness |
| 24 | Schulteraufprallbereich | shoulder-impact zone |
| 26 | Aufprallseite | impact side |
| 28 | Teilfläche | partial surface |
| 30 | Teilfläche | partial surface |
| 32 | Fangband | catch strap |
| 34 | Kammer | chamber |
| 36 | Kammer | chamber |
| 38 | Anlagefläche | abutment surface |
| 40 | Anbindungspunkt | connection point |
| 42 | Anbindungsfläche | connection surface |
| 44 | Generator | generator |
| 46 | Kabinenboden | cabin floor |
| 48 | Fluggastsitzbereich | flight passenger seating area |
| 50 | Passagier | passenger |
| 52 | Sitzboden | seat bottom |
| 54 | Rückenlehne | backrest |
| 56 | Sitzrichtung | seat direction |
| 58 | Shellelement | shell element |
| 60 | Schulteraufprallbereich | shoulder-impact zone |
| 62 | Oberplatte | upper plate |
| 64 | Unterplatte | lower plate |
| 66 | Abnaht | overedging seam |
| 68 | Verbindungskanal | connecting channel |
| 70 | Schlauchelement | hose element |
| 72 | Mantel | envelope |
| 74 | unterer Bereich | lower region |
| 76 | oberer Bereich | upper region |
| 78 | erstes Auslösestadium | first deployment stadium |
| 80 | zweites Auslösestadium | second deployment stadium |
| 82 | drittes Auslösestadium | third deployment stadium |

The invention claimed is:

1. An airplane seat device comprising:
at least one airplane seat;
at least one console arranged in front of the at least one airplane seat with respect to a flight direction extending from a tail to a bow of an airplane; and
at least one airbag element that is configured to protect in a crash event a passenger sitting in the airplane seat from crashing onto the console, wherein
the at least one airbag element features, in a fully deployed state, at least in a head-impact zone, a thickness that is smaller than a thickness of at least one of a first shoulder-impact zone and a second shoulder-impact zone,
the at least one airbag element in the fully deployed state of the airbag element forms a concave impact side that has at least a first partial surface and a second partial surface extending at different angles than a seat direction that the at least one airplane seat faces,
a first peripheral portion of the first partial surface is the first shoulder-impact zone and a second peripheral portion of the second partial surface is the second shoulder-impact zone, and
the first partial surface and the second partial surface of the concave impact side of the at least one airbag element are laterally spaced apart from each other and merge with each other in the head-impact zone.

2. The airplane seat device according to claim 1, wherein: the at least one airplane seat is oriented aslant with respect to the flight direction.

3. The airplane seat device according to claim 1, wherein the at least one airbag element forms an impact side featuring a wedge shape.

4. The airplane seat device according to claim 3, wherein the impact side features an inwards-pointing wedge shape.

5. The airplane seat device according to claim 1, wherein a lower region of the at least one airbag element is, in the fully deployed state, arranged closer to the passenger than an upper region of the at least one airbag element.

6. The airplane seat device according to claim 1, wherein the at least one airbag element is an air cushion in which at least one elastic catch strap is integrated, which is configured to implement a shape of the at least one airbag element.

7. The airplane seat device according to claim 1, wherein the at least one airbag element comprises at least two chambers implemented by overedging seams.

8. The airplane seat device according to claim 1, wherein the at least one airbag element comprises at least one asymmetrical abutment surface which is configured for abutting on an airplane seat component.

9. The airplane seat device according to claim 1, wherein the at least one airbag element has a directed unfolding in a deployment event.

10. The airplane seat device according to claim 1, wherein the at least one airbag element is configured to be vertically unrolled in a deployment event.

11. The airplane seat device according to claim 1, wherein the at least one airbag element is configured to be unrolled from top to bottom.

12. The airplane seat device according to claim 1, wherein the at least one airbag element comprises at least one connection point, via which the airbag element is configured for pointwise connection to an airplane seat component.

13. The airplane seat device according to claim 1, wherein the at least one airbag element comprises at least one connection surface, via which the airbag element is configured to be connected to an airplane seat component in surface-to-surface fashion.

14. The airplane seat device according to claim 1, comprising at least one generator for the at least one airbag element, which is configured to be connected to an airplane seat component in such a way that it is spatially separate from the at least one airbag element.

* * * * *